United States Patent
Abdesselam

(10) Patent No.: US 11,984,789 B2
(45) Date of Patent: May 14, 2024

(54) COOLING DEVICE AND SPEED CHANGE DRIVE UNIT

(71) Applicant: THALES, Courbevoie (FR)

(72) Inventor: Francis Abdesselam, Chatou (FR)

(73) Assignee: THALES, Courbevoie (FR)

(*) Notice: Subject to any disclaimer, the term of this patent is extended or adjusted under 35 U.S.C. 154(b) by 744 days.

(21) Appl. No.: 17/125,629

(22) Filed: Dec. 17, 2020

(65) Prior Publication Data

US 2021/0203206 A1 Jul. 1, 2021

(30) Foreign Application Priority Data

Dec. 31, 2019 (FR) ........................................ 1915680

(51) Int. Cl.
*H02K 5/20* (2006.01)
*H02K 9/22* (2006.01)
*H02K 11/33* (2016.01)

(52) U.S. Cl.
CPC ............... *H02K 5/203* (2021.01); *H02K 5/20* (2013.01); *H02K 9/22* (2013.01); *H02K 11/33* (2016.01)

(58) Field of Classification Search
CPC ............ H02K 5/20; H02K 5/203; H02K 9/22; H02K 1/20; H02K 9/00; H02K 9/02; H02K 9/04; H02K 9/06; H02K 9/08; H02K 9/10; H02K 9/12; H02K 9/14; H02K 9/16; H02K 9/18; H02K 9/19; H02K 9/193; H02K 9/197
USPC ....... 310/68 R, 52, 54, 55, 57, 58, 59, 60 R, 310/60 A, 64
See application file for complete search history.

(56) References Cited

U.S. PATENT DOCUMENTS

| | | | | |
|---|---|---|---|---|
| 6,930,417 | B2 * | 8/2005 | Kaneko ................... | H02K 11/33 310/58 |
| 2016/0181893 | A1 * | 6/2016 | Shrestha ................. | H02K 11/33 310/60 R |
| 2017/0294821 | A1 * | 10/2017 | Shimizu .................. | H02K 9/227 |
| 2019/0181717 | A1 * | 6/2019 | Zhou ....................... | H02K 11/33 |
| 2021/0175771 | A1 * | 6/2021 | Tanabe .................... | H02K 5/203 |

FOREIGN PATENT DOCUMENTS

| | | |
|---|---|---|
| DE | 10 2006 035 697 A1 | 2/2008 |
| DE | 10 2012 218 444 A1 | 4/2014 |
| DE | 10 2015 214 053 A1 | 1/2017 |

* cited by examiner

*Primary Examiner* — Alexander A Singh
(74) *Attorney, Agent, or Firm* — BakerHostetler

(57) ABSTRACT

A cooling structure intended to cool a rotating electrical machine (ME). The cooling structure includes a solid metal body (CM) having an overall tubular form delimited radially by a first contact surface, intended to completely radially surround the electrical machine and to be in physical contact with the electrical machine, and by a second contact surface completely radially surrounding the first contact surface and intended to be in physical contact with a first power module of the set of at least one power module so as to be able to cool the electrical machine and the power module, the cooling structure comprising a set of at least one cooling channel (CR1, CR2, CR3, CR4) formed in the solid metal body (CM), at a distance from the first contact surface and from the second contact surface, wherein a coolant is intended to circulate.

9 Claims, 7 Drawing Sheets

COOLING DEVICE AND SPEED CHANGE DRIVE UNIT

CROSS-REFERENCE TO RELATED APPLICATIONS

This application claims priority to foreign French patent application No. FR 1915680, filed on Dec. 31, 2019, the disclosure of which is incorporated by reference in its entirety.

FIELD OF THE INVENTION

The field of the invention is that of speed change drive units. A speed change drive unit comprises a rotating electrical machine capable of operating in a motor mode in which it transforms an electrical energy into mechanical energy and thus drives a shaft in rotation, and an electronic variable speed drive comprising power components and that makes it possible to vary an electrical power supply signal of the rotating electrical machine operating in motor mode so as to vary a speed of rotation of the motor and/or a torque delivered by the motor.

BACKGROUND

The invention applies notably to the speed change drive units capable of starting a jet engine of an aircraft.

The invention relates more particularly to the cooling of the speed change drive units. In fact, the active parts of the rotating electrical machine (rotor and stator) and the power electronic components of the electronic variable speed drive generate heat that has to be dissipated to avoid a malfunctioning of these elements and, more globally, of the speed change drive unit.

Usually, the rotating electrical machine and to the variable speed drive form distinct subassemblies intended to be linked electrically. Each of these subassemblies is equipped with a dedicated liquid cooling device. This type of speed change drive unit has a high weight. Now, in the aeronautical field, weight saving is a fundamental issue.

There are also speed change drive units in which the rotating electrical machine and the variable speed drive are cooled by one and the same air cooling device comprising a propeller linked to the rotation of the motor. However, air cooling presents limited performance levels.

SUMMARY OF THE INVENTION

One aim of the invention is to limit at least one of the abovementioned drawbacks.

To this end, the subject of the invention is a cooling structure intended to cool a rotating electrical machine and a set of at least one electronic power module of an electronic variable speed drive that makes it possible to vary an electrical power supply signal of the rotating electrical machine so as to vary a speed of rotation of the shaft driven by the electrical machine and/or a torque supplied by the electrical machine, the power module comprising a power component, the cooling structure comprising a solid metal body having an overall tubular form delimited radially by a first contact surface intended to completely radially surround the electrical machine and to be in physical contact with the electrical machine, and by a second contact surface completely radially surrounding the first contact surface and intended to be in physical contact with the first power module of the set of at least one power module so as to be able to cool the electrical machine and the power module, the cooling structure comprising a set of at least one cooling channel formed in the solid metal body, at a distance from the first contact surface and from the second contact surface, in which a coolant is intended to circulate.

Advantageously, the metal body is of a single piece.

Advantageously, the cooling channels are situated at any point at a distance from the first contact surface DI and from the second contact surface SE.

Advantageously, the second contact surface comprises a set of at least one planar face.

Advantageously, a first cooling channel of the set of at least one cooling channel is interposed radially between the first planar face and the contact surface.

In a particular embodiment, the second contact surface has an overall parallelepipedal form.

Advantageously, the cooling structure is structural.

Advantageously, the cooling structure is configured to exhibit an impact resistance, on each of the three axes of an orthogonal reference frame, up to an upper limit or equal to 20 g for a minimum impact duration of 11 ms.

In a particular embodiment, the set of at least one cooling channel comprises several cooling channels configured so as to be linked in parallel.

The invention relates to a speed change drive unit comprising a cooling structure according to the invention; the rotating electrical machine and the electronic variable speed drive. Advantageously, the first contact surface completely radially surrounds the electrical machine and is in physical contact with the electrical machine and the second contact surface is in physical contact with the first power module so as to be able to cool the electrical machine and the power module.

Advantageously, the electrical machine comprises a rotor, a stator and a casing surrounding the stator and the rotor, the metal body being in direct physical contact with the casing.

Advantageously, the electrical machine is force-fitted into a tunnel delimited by the metal body.

BRIEF DESCRIPTION OF THE DRAWINGS

Other features, details and advantages of the invention will emerge on reading the description given with reference to the attached drawings given by way of example and which represent, respectively.

From one figure to another, the same elements are identified by the same references.

DETAILED DESCRIPTION

The invention relates to a speed change drive unit MV and a cooling structure of such a speed change drive unit.

Figure 1:
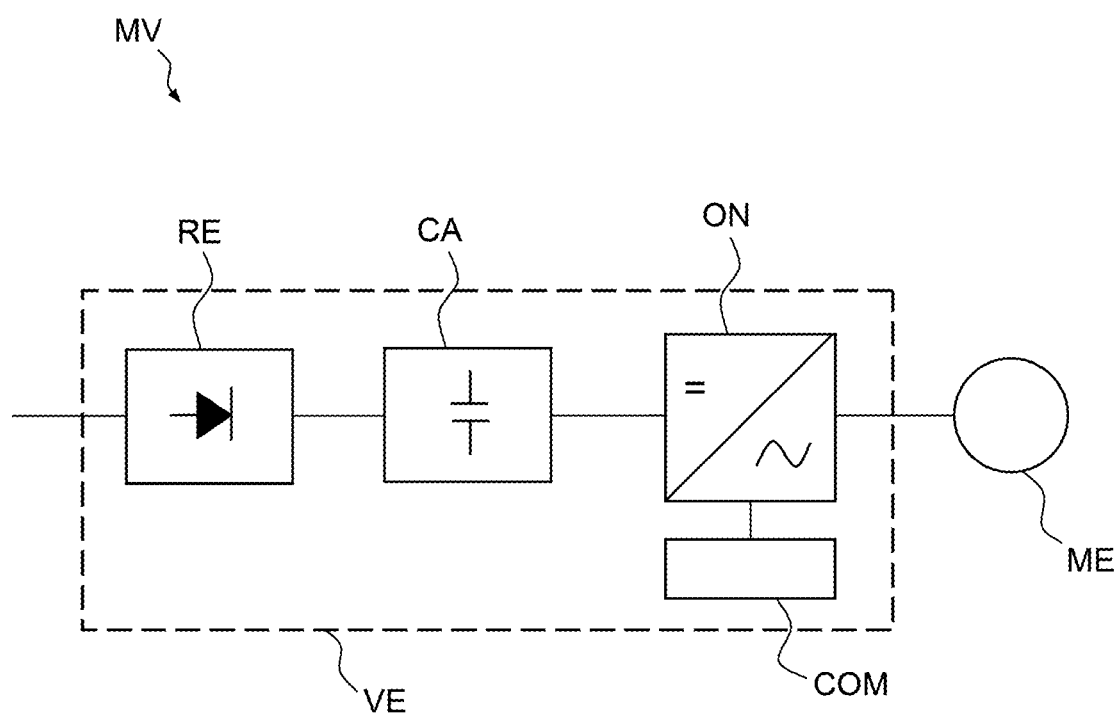
FIG. 1 is a functional diagram of a speed change drive unit according to the invention, FIG. 2 schematically represents, by an exploded view, the elements of an example of speed change drive unit according to the invention, necessary to understanding the invention, this speed change drive unit comprising a cooling structure according to a first embodiment of the invention.

A functional diagram of a nonlimiting example of speed change drive unit is represented in FIG. 1.

The invention relates, notably, to the speed change drive units MV which are starter-generators of aeroplane turbine engines. These speed drive units MV can operate as motor to ensure the starting of a jet engine of an aeroplane and, as generator, to electrically power an electrical network.

The speed change drive unit MV comprises an electric motor or rotating electrical machine ME and an electronic variable speed drive VE that makes it possible to vary an alternating or continuous power supply signal of the electrical machine so as to vary a speed of rotation of the electrical machine when the latter is operating in motor mode and/or so as to vary a torque supplied by the electrical machine when the latter is operating in motor mode.

The electronic variable speed drive VE represented in FIG. 1 is intended to vary an alternating power supply voltage of the electrical machine ME. It comprises a rectifier RE comprising, for example, a diode bridge. The electronic variable speed drive comprises a smoothing capacitor CA (in the case of a voltage source variable speed drive). This smoothing capacitor can be replaced by a smoothing coil (in the case of a current source variable speed drive). The electronic variable speed drive also comprises an inverter ON that makes it possible to deliver an alternating current from a continuous current delivered as output from the smoothing capacitor (or, as in a variant, from the smoothing coil). The inverter comprises controllable switches. The variable speed drive VE also comprises a control module COM that makes it possible to control the controllable switches.

The variable speed drive does not include a rectifier RE when it is powered by a continuous voltage.

The variable speed drive VE comprises a set of electronic power components including the controllable switches of the inverter ON.

A power electronic component is understood to be a component that can be passed through by alternating or continuous currents of several tens of amperes without being damaged.

The variable speed drive VE comprises, for example, insulated gate bipolar transistors, or IGBTs, and/or MOS ("Metal Oxide Silicon") transistors.

The variable speed drive VE can, in addition, comprise semiconductor diodes produced, for example, based on silicon or on silicon carbide.

The electronic variable speed drive VE comprises a set of power modules each comprising a set of at least one power component taken from among the power components of the electronic variable speed drive.

Figure 2:
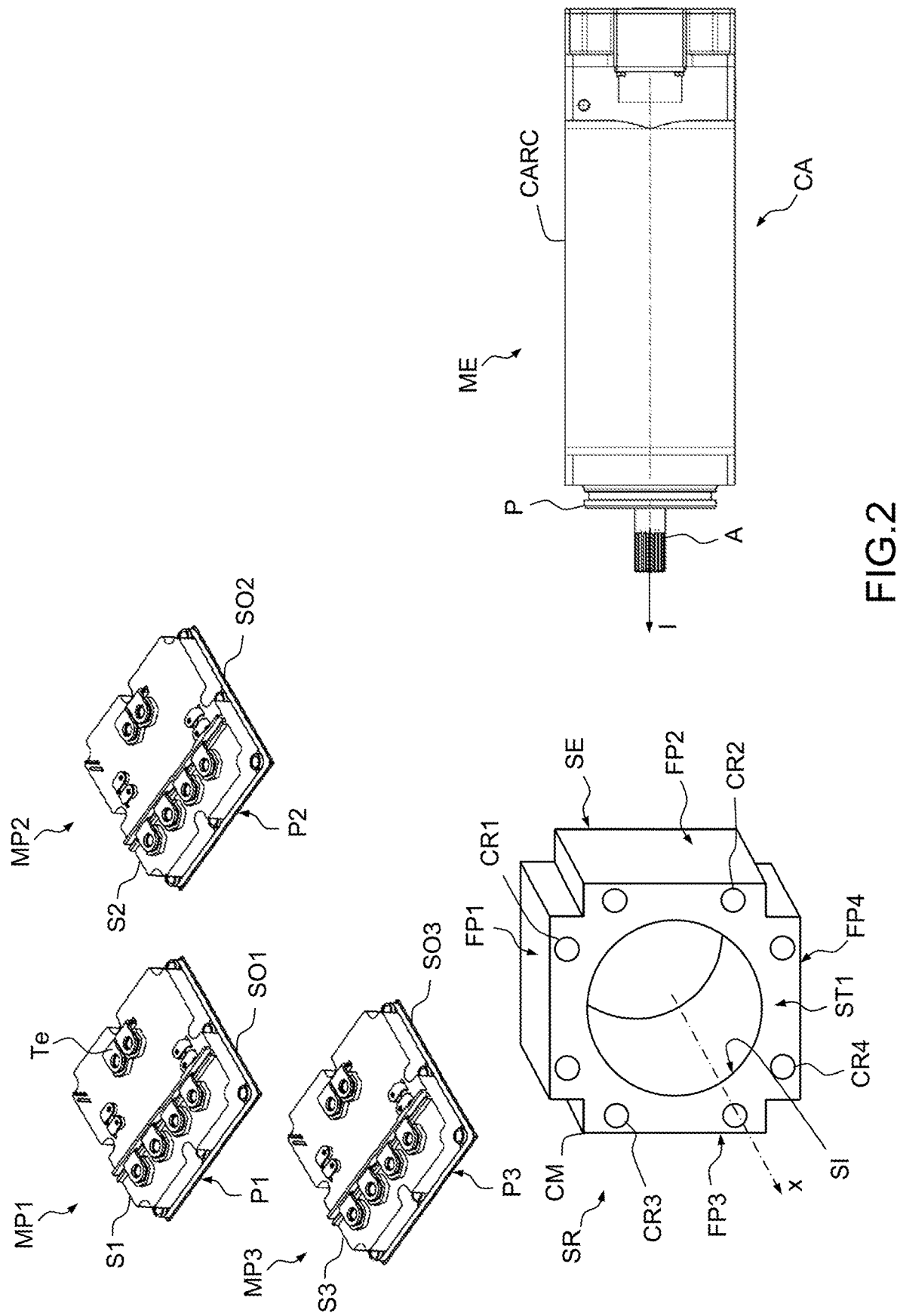

FIG. 2 schematically represents, by an exploded view, the main elements necessary to understanding the invention, of a speed change drive unit MV according to the invention, namely, a cooling structure SR according to a first embodiment of the invention, a rotating electrical machine ME and power modules MP1, MP2, MP3 of the electronic variable speed drive VE of the speed change drive unit MV. Each speed change drive unit comprises a set of at least power components taken from among the power components of the electronic variable speed drive VE.

The speed change drive unit MV comprises an electrical machine ME which is intended to rotate a motor shaft A about an axis of rotation I.

The cooling structure SR according to the invention comprises a solid metal body CM.

The solid metal body CM has an overall tubular form formed around an axis x.

The solid metal body CM is delimited radially by a first contact surface SI completely radially surrounding the axis x and by a second contact surface SE completely radially surrounding the first contact surface SI.

Figure 3:
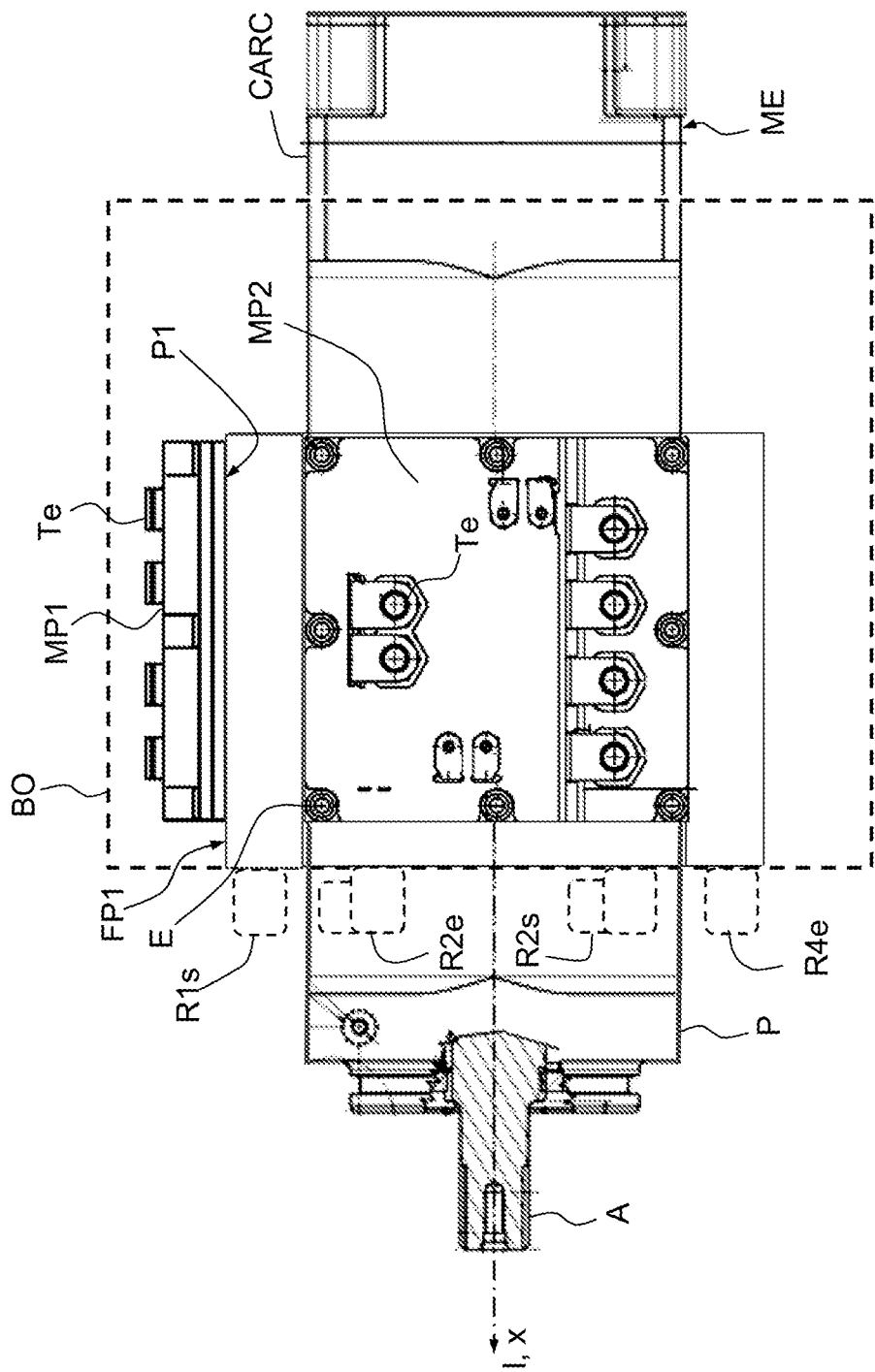
FIG. 3 is a side view of the speed change drive unit of FIG. 2.
Figure 4:
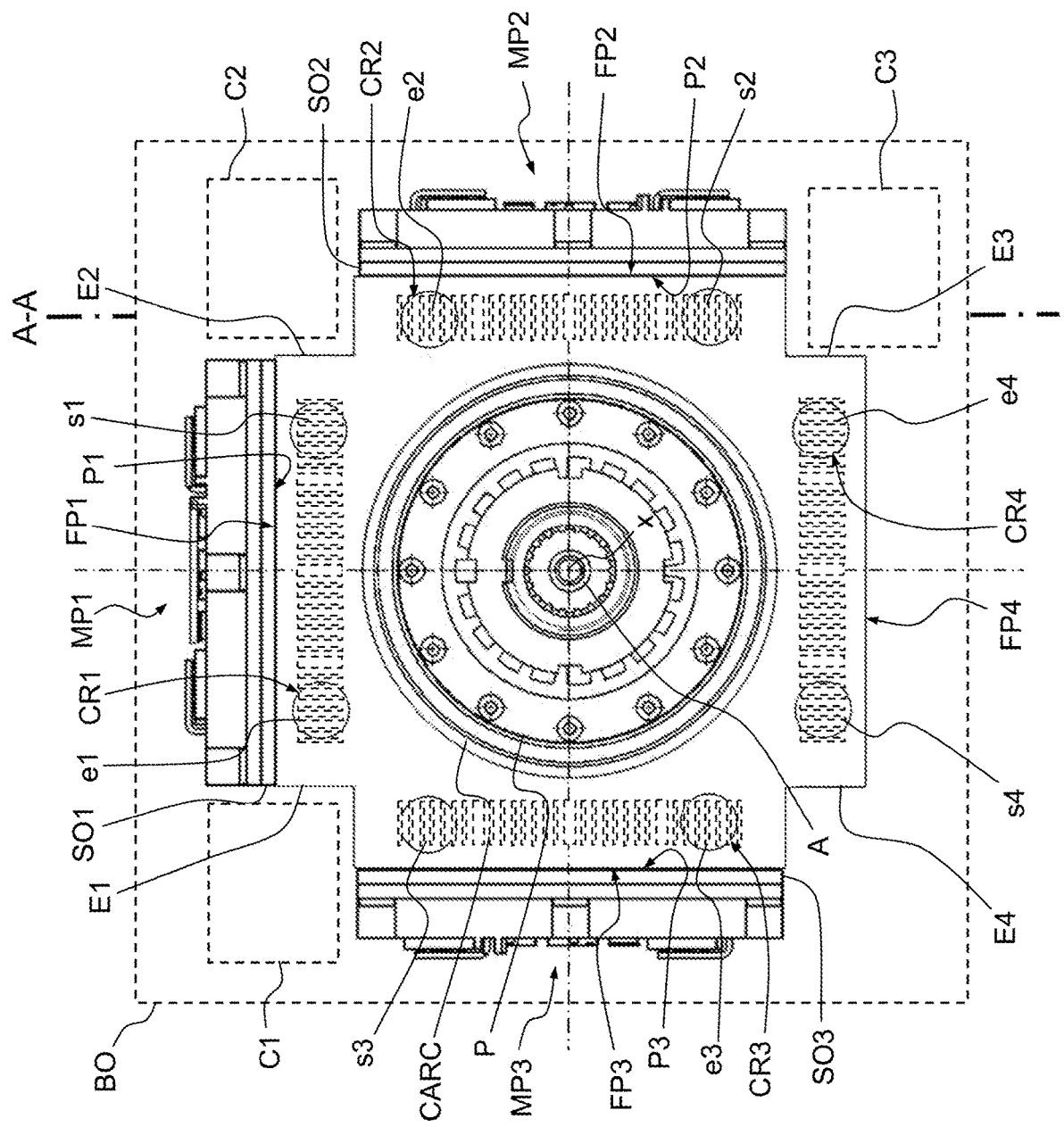
FIG. 4 is a view of the speed change drive unit of FIG. 2.

The second contact surface SE is intended to be in physical contact with the power modules MP1, MP2, MP3 so as to be able to cool the power modules MP1, MP2, MP3, as can be seen in FIG. 3 and in FIG. 4 which represents, by side view and respectively by front view, the elements of FIG. 3 assembled.

The first contact surface SI is intended to completely radially surround the electrical machine ME and to be in physical contact with the electrical machine ME so as to be able to pull the electrical machine ME, as can be seen in FIG. 4.

Thus, as can be seen in FIG. 4, the metal body CM is interposed radially between the electrical machine ME and the power modules MP1, MP2, MP3.

It should be noted that, in the present patent application, the radial aspect is defined with respect to the axis x. The axis x is at right angles to the plane of FIG. 4 and parallel to the plane of FIG. 3.

The solid metal body CM is delimited, along the axis x, by two transverse faces ST1 and ST2, of which only the surface ST1 is visible in FIG. 1, extending substantially at right angles to the axis x.

The cooling structure CM according to the invention also comprises a set of cooling channels CR1, CR2, CR3, CR4 formed in the metal body CM, between the first contact surface and the second contact surface, at a distance from the first contact surface SI and from the second contact surface SE, and in which a coolant is intended to circulate.

Thus, there is continuity of material between the first contact surface SI and the cooling channels CR1, CR2, CR3, CR4 and between the cooling channels CR1, CR2, CR3, CR4 and the second contact surface SE, all around the axis x.

The cooling structure CM can be likened to a tubular cold plate.

The invention therefore makes it possible, by virtue of a single cooling structure SR, to ensure a simultaneous liquid cooling of the power modules MP1, MP2, MP3 and of the electrical machine ME. This solution, using a cooling structure SR, common to the power modules MP1, MP2, MP3 and to the rotating electrical machine ME, is not bulky, relatively lightweight and makes it possible to ensure an efficient cooling of these elements by a coolant.

The cooling is performed by conduction in the solid metal body CM, radially in a first direction, from the electrical machine ME to the channels CR1, CR2, CR3 and, radially in the reverse direction, from the power modules to the channels. The body CM is cooled by conduction by virtue of the circulation of a liquid in the channels which makes it possible to enhance the cooling of the solid metal body CM by conduction. The cooling structure SR completely surrounding the axis x makes it possible to ensure a cooling of the electrical machine ME and of power modules MP1, MP2, MP3, by conduction over 360° about the axis x. The cooling channels CR1, CR2, CR3 can also be distributed angularly all about the axis x to ensure the cooling of the solid metal body CM by convection.

The cooling structure SR makes it possible to dissipate the copper losses, iron losses and mechanical losses of the electrical machine ME, as well as the static and switching losses of the power modules.

The liquid cooling means proposed also makes it possible to guarantee a proximity between the electrical machine ME and its driving function (power modules of the variable speed drive VE) which makes it possible to limit the length of the electrical links between these two functions and therefore to reduce the need for electromagnetic filtering to limit the electromagnetic disturbances conducted in these links and radiated by these links. That makes it possible to reduce the overall weight of the speed drive unit.

Moreover, the liquid is intended to circulate between the surfaces SI and SE at a distance from these surfaces. That makes it possible to ensure a good seal-tightness of the assembly of the different elements and to propose a metal structure that offers a good mechanical strength.

Advantageously, the cooling channels CR1, CR2, CR3, CR4 formed in the metal body CM are situated at any point at a distance from the first contact surface DI and from the second contact surface SE.

Advantageously, each cooling channel CR1, CR2, CR3, CR4 opens only on one transverse face ST1 or, as a variant, on two transverse faces of the solid metal body CM. As can be seen in FIG. 4, the electrical machine ME completely surrounds the axis x radially and the metal body CM completely surrounds the axis x radially.

Advantageously, the axis I substantially coincides with the axis of rotation r.

The metal body CM is, for example, made of aluminium, which offers the advantage of being lightweight, or is made of steel.

Advantageously, the power modules MP1, MP2, MP3 are secured to the solid body CM.

The electrical machine ME conventionally comprises a stator and a rotor. A fixed part of the electrical machine, that is to say a part secured to the stator of the electrical machine, is advantageously secured to the metal body CM.

When the power modules MP1, MP2, MP3 and fixed part of the electrical machine ME are secured to the solid body CM, they form an independent assembly or object that can be moved independently and that can be installed easily, for example, on an aircraft.

Advantageously, the speed change drive unit MV forms an object. To this end, the other elements of the variable speed drive are, for example, fixed to the cooling structure SR.

Advantageously, for an effective cooling of the electrical machine ME, the electrical machine ME is in direct physical contact with the solid body CM and, more particularly, with the first contact surface SI.

Advantageously, in order to ensure an effective cooling of the electrical machine ME, the electrical machine ME is in direct physical contact with the surface SI over all the surface SI.

As a variant, the electrical machine ME is in direct physical contact with the first contact surface SI over all the circumference of the electrical machine ME about the axis x, in a plane at right angles to the axis x and advantageously over a continuous portion of the length of the first contact surface SI along the axis x.

The first contact surface SI delimits a tunnel TU.

Advantageously, the tunnel TU has a form that substantially complements the electrical machine ME.

Advantageously, the tunnel TU has a form that substantially complements the electrical machine ME so that the electrical machine ME can be force-fitted into the tunnel TU.

In order to favour the close contact between the electrical machine ME and the metal body CM, the electrical machine ME is advantageously force-fitted into a tunnel TU.

The electrical machine ME comprises a casing CA radially and axially surrounding a stator of the electrical machine ME.

Advantageously, the metal body CM is in direct physical contact with the casing CA.

The casing CA is a metal body. It is for example made of steel or of aluminium.

The electrical machine ME comprises a stator comprising a stack of metal plates and a rotor. The stator completely radially surrounds the rotor. The casing CA delimits a closed cavity and completely surrounds the rotor and the stator.

The casing CA comprises, for example, a bearing P, enclosing, for example, a ball bearing so as to axially enclose a volume inside which the rotor and the stator are inserted, and a tubular field frame CARC radially surrounding the rotor and the stator of the electrical machine ME.

In a variant to the embodiment of the figures, the metal body CM is in direct physical contact with the stator. In other words, the metal body is in direct physical contact with a metal plate of the stator of the electrical machine ME. That makes it possible to improve the cooling of the stator and of the rotor and to limit the weight of the speed change drive unit.

As can be seen in FIG. 2, each power module MP1, MP2, MP3 comprises a support S1, S2, S3 supporting a power component. The support S1, S2, S3 comprises a base SO1, SO2, SO3 that can be see in FIG. 4 supporting a power component.

Each power module MP1, MP2, MP3 comprises, for example, electrical terminations Te.

In the nonlimiting example of FIG. 2, each support S1, S2, S3 is a housing enclosing at least one power component and comprising a base SO1, SO2, SO3.

The support S1, S2, S3, and more particularly the base SO1, SO2, SO3, is advantageously in direct physical contact with the solid body CM and more particularly with the second contact surface SE. That makes it possible to ensure an effective cooling of the power component, each power module discharging calories by conduction through its base SO1, SO2, SO3 to the respective cooling channels CR1, CR2, CR3, CR4 by passing through the solid body CM.

As a variant, the support consists of the base SO1, SO2, SO3 to which one or more power components is or are fixed.

As a variant, a power component is in direct physical contact with the solid body CM.

The power modules MP1, MP2, MP3 are, for example, removably fixed to the solid body CM by fixing means such as, for example, nuts E that can be seen in FIG. 3.

Advantageously, the second contact surface SE comprises, as can be seen in FIGS. 2 and 4, one or more planar faces FP1, FP2, FP3, FP4 and each power module MP1, MP2, MP3 comprises a planar face of the module P1, P2, P3 in direct physical contact with, that is to say attached to, one of the planar faces FP1, FP2, FP3. That makes it possible to ensure a significant contact surface area between the metal body CM and the power modules MP1, MP2, MP3 and therefore to ensure an effective cooling of the power modules by conduction to the metal body CM.

The planar face P1, P2 or P3 is, for example, a planar face of the base SO1, SO2, SO3.

Advantageously, for an effective cooling, the planar face P1, P2 or P3 is the largest planar face of the power module MP1, MP2 or MP3 considered. That makes it possible to maximize the contact surface area between the power module and the solid body CM.

Advantageously, the planar face P1, P2, or P3 of the power module is in direct physical contact with the planar face FP1, FP2, FP3, FP4 of the solid body CM, over all the surface of the planar face P1, P2, P3.

In the nonlimiting example of the figures, the second contact surface SE has an overall parallelepipedal form comprising four main planar faces FP1, FP2, FP3, FP4 that are pairwise parallel and pairwise face one another.

In the nonlimiting example of the figures, the speed change drive unit MV comprises three power modules MP1, MP2, MP3. Each power module MP1, MP2, MP3 is fixed to one of the main planar faces FP1, FP2, FP3. The respective power modules are fixed to different respective main planar faces. One power module is fixed to each main planar face, that is to say facing a planar face, for example contiguous to the planar face.

The overall rectangular form of the second contact surface SE, in a plane at right angles to the axis x, has no vertices. This second contact surface SE comprises notches E1, E2, E3, E4, referenced in FIG. 4, and pairwise separating the planar faces FP1, FP2, FP3, FP4. That makes it possible to offer a greater exchange surface area between the surrounding air and the metal body CM. That also makes it possible to house components within the volume delimited by the notches and limits the volume occupied by the speed change drive unit, radially, beyond the outer surface SE.

Capacitors or other electronic components C1, C2, C3, represented by dotted lines only in FIG. 4, are, for example, partially housed in the notches E1, E2, E3 and E4. Preferably, the components C1, C2, C3 are, preferably, arranged at a distance from the second contact surface SE so as to protect them from overheating.

It should be noted that the number of planar faces is not limited to that of the example of the figures, nor is the number of power modules arranged facing each planar face.

By virtue of the provision of a cooling structure having a second contact surface SE having several planar faces FP1, FP2, FP3, FP4, it becomes possible to ensure an effective cooling of a high number of power modules.

In the exemplary embodiments described above, the electrical machine ME is advantageously in direct physical contact with the first contact surface SI and the power modules MP1, MP2, MP3 are advantageously in direct physical contact with the second contact surface SE.

As a variant, the electrical machine ME is separated from the first contact surface SI only by a thermal interface and/or at least one power module or power component is separated from the second contact surface SE only by a thermal interface.

A thermal interface is a thermal interface material, referred to by its acronym TIM, such as, for example, a thermal paste. This type of material favours the conduction of heat between two elements adjoined to this interface.

In the nonlimiting example of the figures, the cooling structure SR comprises four cooling channels CR1, CR2, CR3, CR4. As a variant, the cooling structure comprises a different number of cooling channels, for example one or more cooling channels.

Each cooling channel CR1, CR2, CR3, CR4 is intended to receive a liquid intended to circulate in the channel.

The cooling channels CR1, CR2, CR3, CR4 are distributed angularly about the axis x.

Each power module MP1, MP2 or MP3, fixed to the outer surface SE, is separated radially from the electrical machine ME or from the internal surface SI by a cooling channel CR1, CR2 or, respectively, CR3. That makes it possible to ensure an effective cooling of the power modules.

In the advantageous embodiment of the figures, as can be seen in FIG. 2, each channel CR1, CR2, CR3, CR4 is interposed radially between a planar face FP1, FP2, FP3, respectively FP4, and the first contact surface SI.

In the advantageous embodiment of the figures, as can be seen in FIG. 2, the solid body CM is of a single piece. The channels CR1, CR2, CR3, CR4 are formed in the single-piece solid body CM.

Each channel CR1, CR2, CR3, CR4 is located within an overall parallelepipedal volume having a larger face of the parallelepiped facing one of the planar faces FP1, FP2, FP3, FP4 adjacent to the channel CR1, CR2, CR3, CR4 considered.

Figure 5:
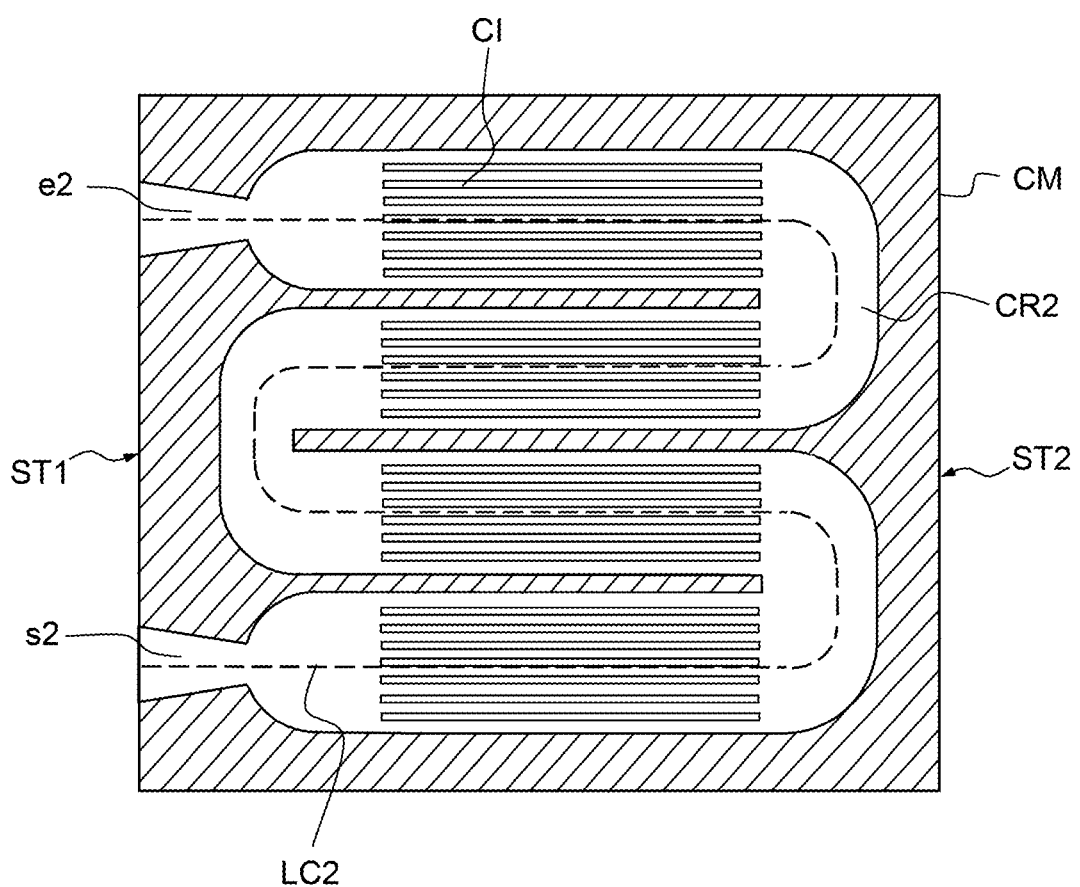
FIG. 5 is a schematic representation in cross section of the cooling structure according to the first embodiment of the invention, on a cutting plane A-A visible in FIG. 4, parallel to a planar face of a second contact surface of the cooling structure and passing through a second cooling channel of the cooling structure.

A cross-sectional view of the cooling structure, along the plane A-A that can be seen in FIG. 4, in a transverse plane B (visible in FIG. 2), is represented in FIG. 5. The channel CR2 houses partitions CI that are at right angles to the planar face FP2, adjacent to the channel CR2, and extending longitudinally according to the axis x. These partitions CI are represented by dotted lines in FIG. 4 because they are not visible from the outside of the single-piece body CM. These partitions are formed by the single-piece body CM. The partitions CI divide longitudinal portions of the channel CR2 into several adjacent longitudinal channels so as to make it possible to speed up the flow of liquid in the cooling channel CR2.

The channels CR2 comprises, like each other cooling channel, an input e2 through which the liquid is intended to enter into the channel and an output s2 through which the liquid is intended to exit from the channel CR2.

The inputs and outputs of the channels are linked to couplings R2e, R2s, R1s, R4e, some of which are represented by dotted lines in FIG. 3. These coupling circuits form part of circulation circuits which will be described later. Each coupling makes it possible to fluidically connect the considered cooling channel to other elements of a fluid circulation circuit in the cooling channel.

The solid body CM is, for example, obtained by machining a parallelepipedal metal block. The machining comprises a step of machining of the metal block to form the tunnel, a machining step to produce the notches, a machining step to form each of the cooling channels and a step for forming the partitions. At least one step can, as a variant, be performed by casting.

As a variant, the solid body CM is obtained by additive manufacturing (3D printing). This step is faster than machining. Additive manufacturing makes it possible to obtain a cooling structure of reduced weight that has a good mechanical strength.

The fact that the solid body CM is of a single piece makes it possible to easily obtain a cooling structure that has mechanical characteristics compatible with obtaining a structural cooling structure.

As a variant, the solid body CM comprises an assembly of several parts.

For example, the solid body CM comprises a single-piece body delimiting parallelepipedal cavities. Within each parallelepipedal cavity, there is inserted a metal block delimiting one of the cooling channels so as to form the solid body.

Advantageously, the cooling structure SR is structural. That makes it possible to use the part to link the electrical machine ME to equipment in which it is intended to operate, for example to a structure of an aeroplane. That makes it possible to void having to provide a dedicated structural part, which makes it possible to obtain a weight saving. The cooling structure thus serves a triple function of cooling of the electrical machine, of cooling of power modules and of mechanical support.

To this end, the cooling structure is advantageously configured to exhibit an impact resistance, on each of the three axes of an orthogonal reference frame, up to a limit greater than or equal to 20 g (g being the acceleration of gravity on the surface of the earth equal to $9.80665 \text{ m·s}^{-2}$) for a minimum impact duration of 11 ms. The orthogonal reference frame is fixed with respect to the cooling structure.

Each cooling channel CR1, CR2, CR3 or CR4 follows a median curved line LC2 as represented by dotted lines in FIG. 5, for example a coil, situated in a plane, for example the plane A-A of FIG. 5 for the channel CR2. In other words, the cooling channel CR2 is intended to make a liquid circulate along a median curve situated in a plane A-A and extending from an input e2 of the cooling channel CR2 to an output s2 of the cooling channel CR2.

This plane is substantially parallel to the planar face FP1, FP2, FP3, FP4 adjacent to the considered cooling channel CR1, CR2, CR3 or, respectively, CR4 and from which the cooling channel CR1, CR2, CR3 or respectively CR4 radially separates the electrical machine ME.

In the first embodiment, each cooling channel CR1, CR2, CR3, CR4 comprises, as can be seen in FIG. 5, duct portions extending substantially linearly along the axis x which are linked by curved portions. The linear portions are substantially parallel to one another and are separated pairwise on an axis of the plane comprising the median curve formed by the channel and at right angles to the axis x.

Figure 6:
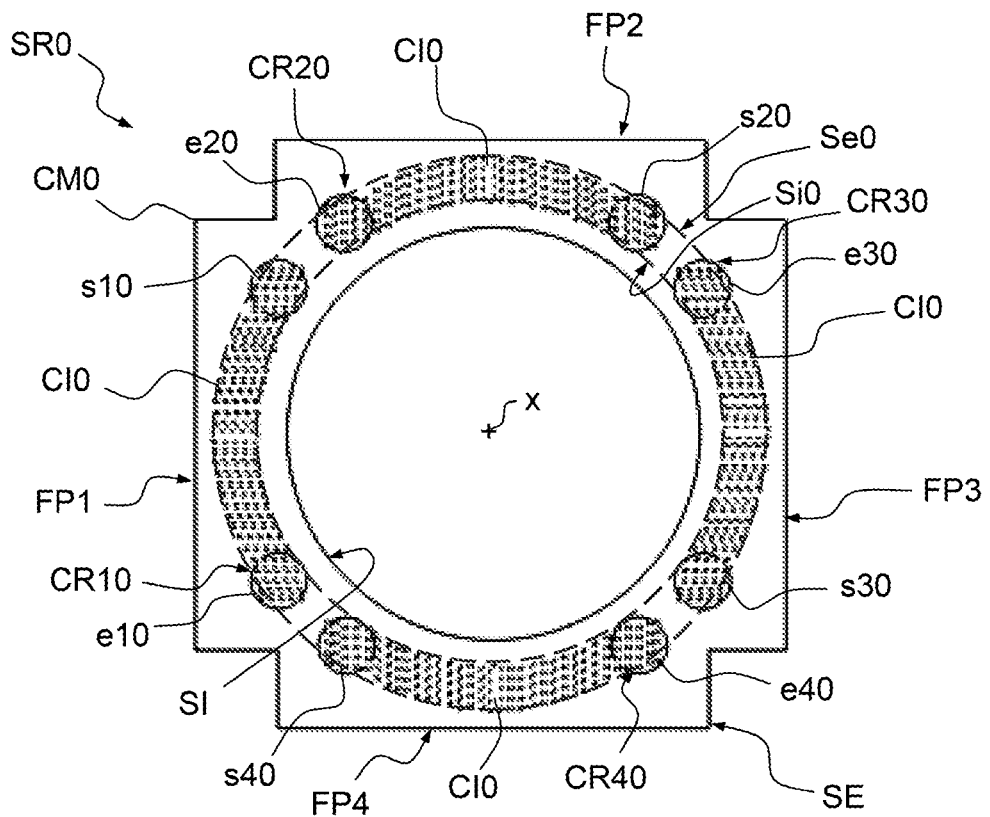
FIG. 6 is a front view of a cooling structure according to a second embodiment of the invention.

The cooling structure SRO of FIG. 6 is a cooling structure according to a second embodiment of the invention. It differs from the structure according to the first embodiment in that the cooling channels CR10, CR20, CR30 and CR40 formed in the solid body CM0 follow a median curve line contained within an angular portion of a surface of a straight circular cylinder of axis x.

In the nonlimiting embodiment of the figures, the first contact surface SI is substantially a straight circular cylinder of axis x.

More generally, the median curve followed by a cooling channel is advantageously contained within an angular portion of a surface of a straight cylinder of axis x whose section, in each plane at right angles to the axis x, is substantially obtained by centred dilations situated on the axis x, from the first contact surface SI. This configuration makes it possible to favour the discharging of the heat by the electrical machine ME.

In other words, the cooling channels CR10, CR20, CR30 CR40 are situated in an elementary tubular tube of axis x delimited radially by an elementary inner surface Si0 and an elementary outer surface Se0 situated between the first contact surface SI and the second contact surface SE and the sections of which, in each plane at right angles to the axis x, are substantially obtained by centred dilations situated on the axis x, from the first contact surface SI. Each elementary duct CR10, CR20, CR30 CR40 houses partitions CIO represented by dotted lines in FIG. 6. Each cooling channel extends from an input e10, e20, e30, e40 to an output s10, s20, s30, s40 of the cooling channel.

The cooling channels have elongate portions along the axis x distributed angularly about the axis x, situated at the same distance from the axis x and linked by curved parts.

Figure 7:
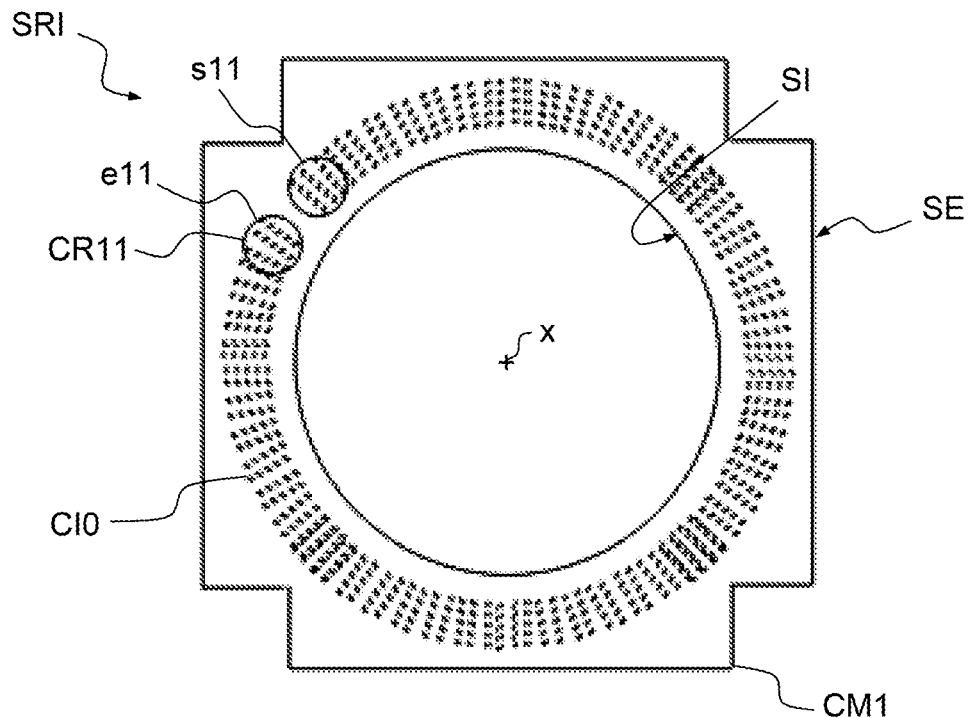
FIG. 7 is a front view of a cooling structure according to a third embodiment of the invention.

The cooling structure SRI according to a third embodiment of the invention represented in FIG. 7 differs from that of FIG. 1 in that it comprises a single cooling channel CR11 formed in the solid body CM1 extending from an input e11 to an output s11.

The form of the channels is nonlimiting, the cooling structure can, for example, comprise a channel helically wound about the axis x.

Advantageously, the cooling channels CR1, CR2, CR3, CR4 are configured so as to be able to be linked in parallel as represented in FIG. 5. To this end, the inputs e1, e2, e3, e4 of the different cooling channels CR1, CR2, CR3, CR4 are distinct and the outputs S1, s2, s3, s4 of the different cooling channels CR1, CR2, CR3, CR4 are also distinct.

Figure 8:
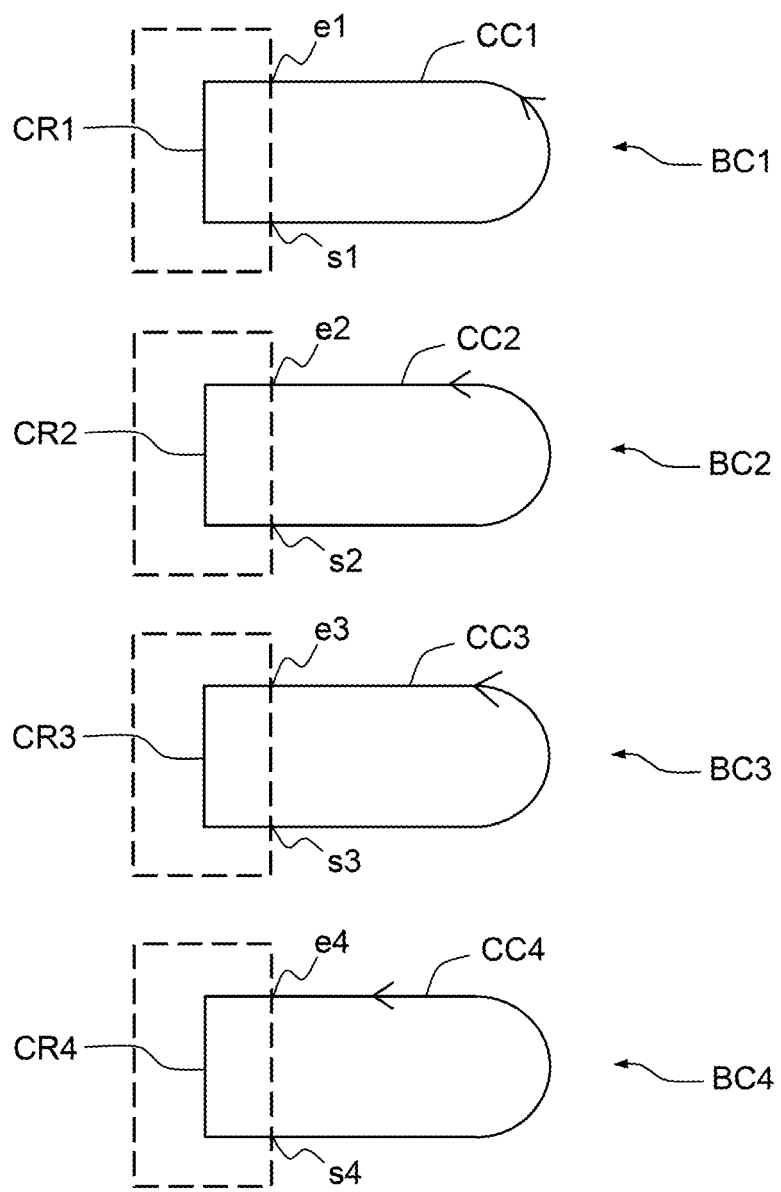
FIG. 8 is a schematic representation of an example of cooling loops of a speed change drive unit comprising a cooling structure according to the first embodiment of the invention.

Advantageously, the cooling channels CR1, CR2, CR3, CR4 are linked in parallel as shown in FIG. 8. That makes it possible to limit the sensitivity of the cooling performance levels to a cooling loop defect by ensuring cooling redundancy. That therefore makes it possible to maintain the availability of the electrical machine even in the event of failure or of a defect of one of the circulation loops (valve fault, reduction of flow rate by a leak or a blocked channel, etc.). This solution also makes it possible to obtain a certain uniformity of the cooling of the electrical machine about the axis x.

To this end, the speed change drive unit comprises a set of cooling loops in which a liquid is intended to circulate in closed loop fashion. Each loop BC1, BC2, BC3 or BC4 comprises one of the cooling channels CR1, CR2, CR3 or CR4 and a circulation circuit CC1, CC2, CC3 or, respectively, CC4, making it possible to make the liquid circulate in the cooling channel CR1, CR2, CR3, or, respectively, CR4. In other words, each cooling circuit makes it possible to inject the liquid at the input e1, e2, e3 or e4 of the considered cooling channel CR1, CR2, CR3 or, respectively, CR4, and to recover it at its output S1, s2, s3, or, respectively, s4, to reinject it at the output e1, e2, e3, or, respectively, e4.

Each circulation circuit comprises, for example, a pump and a heat exchanger.

The liquid is, for example, water or oil.

As a variant, several cooling channels belong to one and the same cooling loop. The cooling performance levels are then more sensitive to a failure in a cooling loop. Furthermore, the cooling can become less effective and extremely non-uniform about the axis x.

The speed change drive unit according to the invention can comprise a protective housing, represented by dotted lines in FIGS. 3 and 4, radially surrounding the cooling structure and the power modules fixed to the cooling structure.

The invention claimed is:

1. A cooling structure intended to cool a rotating electrical machine (ME) and a set of at least one electronic power module of an electronic variable speed drive making it possible to vary an electrical power supply signal of the rotating electrical machine (ME) so as to vary a rotation speed of a shaft (A) driven by the electrical machine (ME) and/or a torque supplied by the electrical machine (ME), the electronic power module comprising a power component, the cooling structure comprising a solid metal body (CM) having an overall tubular form delimited radially by a first contact surface intended to completely radially surround the electrical machine and to be in physical contact with the electrical machine and by a second contact surface completely radially surrounding the first contact surface and intended to be in physical contact with a first power module of the set of at least one power module so as to be able to cool the electrical machine and the power module, the cooling structure comprising a set of at least one cooling channel (CR1, CR2, CR3, CR4) formed in the solid metal body (CM), at a distance from the first contact surface and from the second contact surface, in which a coolant is intended to circulate, the solid metal body (CM) being of a single piece, wherein the second contact surface has an overall parallelepipedal form.

2. The cooling structure according to claim 1, wherein each cooling channel extends at any point at a distance from the first contact surface and at a distance from the second contact surface.

3. The cooling structure according to claim 1, wherein the second contact surface comprises a set of at least one planar face (FP1, FP2, FP3, FP4).

4. The cooling structure according to claim 3, wherein a first cooling channel of the set of at least one cooling channel is interposed radially between the first planar face and the contact surface.

5. The cooling structure according to claim 1, wherein the cooling structure is configured to exhibit an impact resistance, on each of the three axes of an orthogonal reference frame, up to a limit greater than or equal to 20 g for a minimum impact duration of 11 ms.

6. The cooling structure according to claim 1, wherein the set of at least one cooling channel comprises several cooling channels configured so as to be able to be linked in parallel.

7. A speed change drive unit comprising the cooling structure according to claim 1, the rotating electrical machine (ME) and the electronic variable speed drive (VE) and wherein the first contact surface completely radially surrounds the electrical machine and is in physical contact with the electrical machine and the second contact surface is in physical contact with the first power module so as to be able to cool the electrical machine and the power module.

8. The speed change drive unit according to claim 7, wherein the electrical machine (ME) comprises a rotor, a stator and a casing (CA) surrounding the stator and the rotor, the metallic body (CM) being in direct physical contact with the casing.

9. The speed change drive unit (MV) according to claim 7, wherein the electrical machine (ME) is forced-fitted in a tunnel (TU) delimited by the metallic body (CM).

* * * * *